Aug. 10, 1954     A. I. APPLETON ET AL     2,686,216
SERVICE ENTRANCE FITTING
Filed Nov. 24, 1950
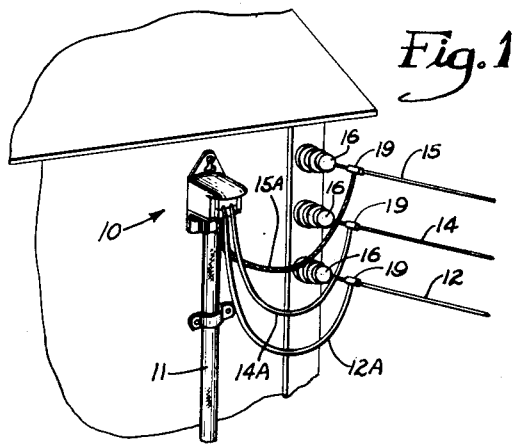
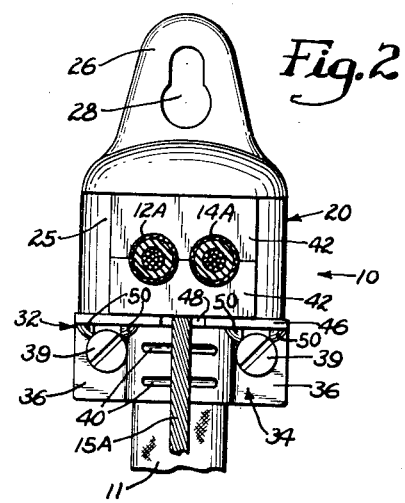
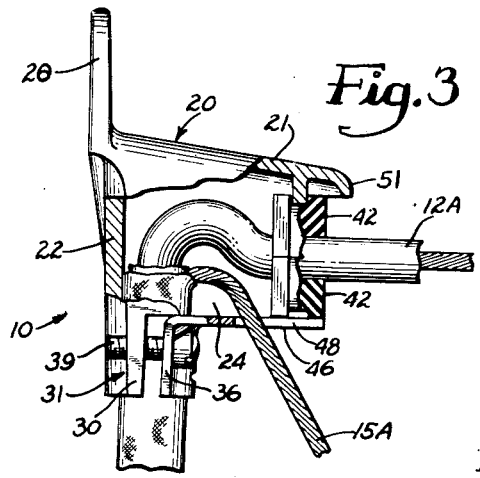
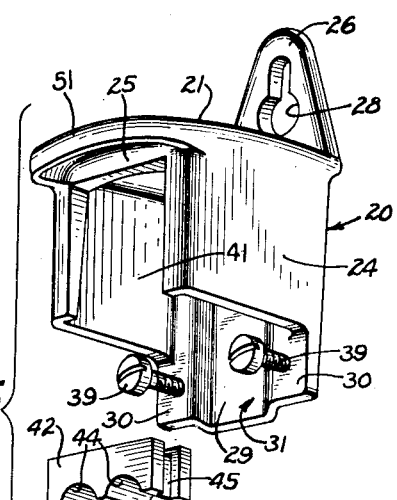
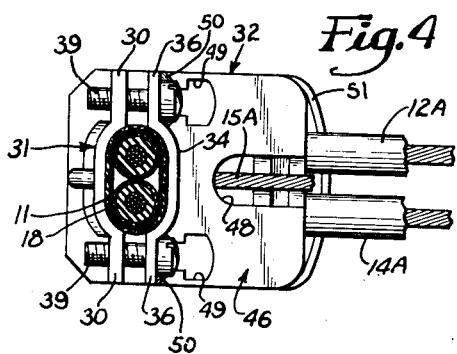
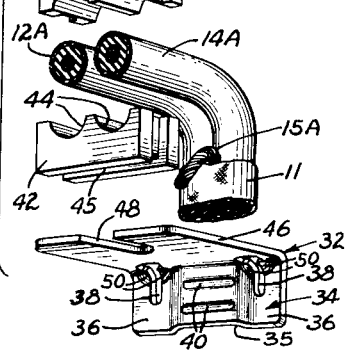
INVENTORS
Nils A. Tornblom
Arthur I. Appleton
Carlson, Pitzner, Hubbard & Wolfe
Attys.

Patented Aug. 10, 1954

2,686,216

UNITED STATES PATENT OFFICE 2,686,216

SERVICE ENTRANCE FITTING

Arthur I. Appleton, Northbrook, and Nils A. Tornblom, Chicago, Ill., assignors to Appleton Electric Company, Chicago, Ill., a corporation of Illinois Application November 24, 1950, Serial No. 197,294

4 Claims. (Cl. 174—81)

The present invention relates to service entrance fittings for connecting overhead electric power supply cables with the electric power systems of residences and other buildings. More particularly, the invention is concerned with a novel service entrance fitting adapted for installation on the outside wall of a building and which leads individual service wires from overhead power supply cables to a vertical entrance cable leading to the user's meter box.

One object of the invention is to provide a service entrance fitting of simplified construction and which will afford a firm anchorage for the upper end of the entrance cable and also a firm anchorage for the individual service wires leading thereto from the overhead supply cables, such anchorages being rendered effective by the use of a single securing means.

Another object is to provide a fitting of the character set forth and which will be not only susceptible of economical manufacture but also capable of rapid installation by skilled or unskilled personnel.

Other objects and advantages will become apparent as the following description proceeds, taken in connection with the accompanying drawings, wherein:

Figure 1 is a perspective view of an illustrative service entrance fitting embodying the invention and mounted on the outside wall of a building in proximity to the ends of the overhead electric power supply cables.

Fig. 2 is a front elevation of the illustrative service entrance fitting of Fig. 1 with the insulated service wires shown in section.

Fig. 3 is a broken vertical sectional view through the fitting of Fig. 1, with the entrance cable, the service wires and certain parts associated therewith shown in side elevation.

Fig. 4 is a bottom plan view of the fitting of Fig. 1 with the entrance cable shown in horizontal section.

Fig. 5 is an exploded perspective view of the fitting of Fig. 1, together with that portion of the entrance cable normally housed therein.

While the invention is susceptible of various modifications and alternative constructions, a preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claims.

Upon more specific reference to the drawing, it will be noted that the invention is there shown embodied in an illustrative entrance fitting 10. The latter may be mounted at a high point on the outside wall of a residence or other building, as shown in Fig. 1, and in tightly clamped relation with the head end portion of a vertical entrance cable 11 leading to a meter box and thence to the electric power system of the building. In this instance, power is furnished to the building via overhead electrical supply cables 12 and 14, together with a neutral cable 15, all such cables terminating at anchor mountings 16 fixed on the side wall of the building. The supply cables 12, 14 are respectively connected to the entrance cable 11 by insulated service wires 12A, 14A which pass through the fitting 10 and thence into the sheath of the entrance cable 11. Neutral cable 15 is connected to the woven metallic grounding sheath 18 of the cable 11 via jumper 15A which also passes through the fitting 10, the jumper 15A in this case being formed by splitting and twisting a portion of the metallic grounding sheath 18. The foregoing connections between the jumpers and the overhead cable may be made in any suitable manner, as by means of connector elements 19 located adjacent the mountings 16.

The fitting 10 is built upon a metallic head 20 of inverted box-like shape and in the present instance happens to be of integral construction. The head 20 is defined by a convex top wall 21, a rear wall 22, a pair of side walls 24, and a cutaway front wall 25. The head 20 is also provided with an upstanding hanger 26 substantially coplanar with the rear wall 22 and having a keyhole slot 28 for attaching the fitting to the building wall or other appropriate support.

Provision is made for securely clamping the upper end portion of the entrance cable 11 within the fitting 10. This is accomplished by fashioning the rear wall 22 with a shallow cable receiving channel 29 flanked by longitudinal shoulders 30 and also by forming the wall 22 with a downwardly extending clamping portion or apron 31 depending below the side and front walls 24, 25. Operatively associated with the depending apron 31 is a clamping plate 32. The latter has a gripping portion 34 adapted to cooperate with the apron 31, the portion 34 being formed with a cable receiving channel 35 straddled by a pair of flats 36 having screw slots 38. The cable 11 can be squeezed between the dependnig apron 31 and the gripping portion 34 of the clamping plate 32 by means of clamping screws 39 which pass through the slots 38 and threadedly engage the shoulders 30. The clamping action may be enhanced as by the use of one or more transverse gripping ribs 40 in the cable receiving channel of the clamping portion 34.

For the purpose of protecting the service wires 12A, 14A against chafing on each other or on the fitting 10, resort is had to an insulated gripping means capable of engaging the service wires at a point spaced from the cable clamping means 31, 34 and operable as an incident to tightening of the clamping means 31, 34. In furtherance of such objective, the front wall 25 of the head 20 is formed with a relatively large rectangular notch 41 bounded on three sides by a marginal area of substantially inverted U-shape. Slidably mounted within the notch 41 are a pair of bridge-like gripping blocks 42 of insulating material and which cooperate to grip therebetween the service wires 12A, 14A. For this purpose, the abutting faces of the blocks 42 are provided with laterally spaced, concave wire gripping channels 44 adapted to snugly engage the exterior of the respective service wires. Each of the blocks 42 has an outer peripheral groove 45 thereon which receives the marginal wall portion surrounding the notch 41 and thereby holds the block in the plane of the front wall 25. While it is not necessary to run the groove 45 along the bottom of the lower block 42, it is desirable to do so since this makes both of the blocks 42 identical and thereby simplifies installation procedure. To retain the blocks 42 within the head 20 and in gripping relation with the service wires 12A, 14A, the clamping plate 32 has an extension 46 of sufficient length to underlie the blocks 42 and serve as a bottom closure for the fitting 10 (see Figs. 3 and 4). The extension 46 is of course provided with a suitable aperture 48 through which neutral jumper 15A passes since the latter is not engaged by the gripping blocks 42.

Assembly of the clamping plate 32 to the head 20 is greatly facilitated by extending the screw slots 38 into the clamping plate extension 46, terminating such slots in lateral enlargements 49 (Figs. 4 and 5). By making the latter of appropriate size to pass over the heads of the clamping screws 39, it will be apparent that the clamping plate can be assembled to the head 20 without first removing the clamping screws from the apron 31. Such arrangement is highly advantageous upon installation of the fitting 10 since the electrician need only be concerned with handling the gripping blocks 42 and the clamping plate 32 and need not worry about starting or dropping the clamping screws. The foregoing arrangement also possesses another advantage if the lateral enlargements 49 are spaced from the gripping portion 34 by an amount corresponding approximately to the thickness of the clamping screw heads. This defines a pair of safety shoulders 50 in the clamping plate extension 46 adjacent each of the enlargements 49. When the clamping screws are tightened in place, the shoulders 50 are in alinement with their heads. In the event that the screws are not completely tightened initially, or, in the event that the screws loosen up slightly for some reason or other after installation, there is no likelihood that the clamping plate will become disengaged from the head 20 since the safety shoulders will then accost the heads of the clamping screws 39.

In order to force the blocks 42 into tightly gripping relation with the service wires as an incident to tightening of the clamping members 31, 34, the gripping portion 34 of the clamping plate 32 is disposed so as to define an angle slightly greater than 90 degrees between itself and the plate extension 46 (see Fig. 3). By the same token, the clamping screws 39 are disposed in substantially parallel relation with the extension 46 but slightly skewed relation with the gripping portion 34. In addition, the safety shoulders 50 are outstruck from the planes of the flats 36 and the plate 46 so that each shoulder 50 lies across the angular corner separating the elements 36, 46. Accordingly, as the clamping screws 39 are tightened, their heads approach the flats 36 and are accosted by the raised portions of the shoulders 50 respectively underlying such heads. At the same time, the lower one of the gripping ribs 40 begins to bear against the cable 11 prior to the upper one of the ribs 40. With continued tightening of the screws 39, the clamping plate 32 fulcrums about the lower one of the gripping ribs 40 and rocks counterclockwise as viewed in Fig. 3, forcing the free end of the plate extension 46 upwardly and tightly against the lower gripping block 42.

Protection against mechanical impacts due to stones and the like is afforded the gripping blocks 42 by forming the top wall 21 of the head with an overhang 51. The latter also affords a limited amount of protection against the weather by preventing rain from directly driving in behind the gripping blocks 42. In addition, the overhang 51 enhances the appearance of the fitting 10.

In view of the foregoing description, the manner in which the service entrance fitting 10 may be installed will doubtless be apparent to those skilled in the art. However, it might be helpful at this point to reiterate installation procedure briefly. Assume first that the power supply cables 12, 14 and 15 are already installed as shown in Fig. 1. The usual first step is for the electrician to take the end of a length of entrance cable, such as the cable 11, and to split its exterior sheath as well as the metallic grounding sheath 18 away from the service wires for a distance approximately equal to the length of the service wire loops which are to be run from the overhead supply cables 12, 14 and 15 to the fitting 10. The split portion of the metallic grounding sheath 18 can thereupon be twisted to define the jumper 15A which connects with the neutral cable 15, or, if desired, another piece of wire may be used in place of the twisted sheath. At this point, and while the electrician is still on the ground, the entrance cable 11 may be pushed inside the fitting head 20 with its exterior sheath projecting well into the same so as to occupy the position indicated in Fig. 3. The gripping blocks 42 and the clamping plate 32 may then be assembled in the manner described earlier herein. When these steps have been taken, the installing electrician then secures the service entrance fitting 10 in a desired position upon the building wall by means of the hanger 26 and a suitable mounting screw. The entrance cable 11 may then be run downwardly along the building wall and secured thereto in vertical alinement with the fitting 10 as by means of a series of vertically spaced cleats. The remaining two steps in installation are connection of the lower end of the entrance cable 11 to the meter box and connection of the free ends of the service wires 12A, 14A and the jumper 15A to their corresponding overhead cables by the use of the connector elements 19. The sequence of these last two steps is not critical. While the service entrance fitting 10 is sufficiently versatile to permit installation of the same on the building wall before the entrance cable 11 is clamped therein, the preferable installation procedure is to attach the cable first in the manner outlined above.

The illustrative fitting 10 has been described in connection with a three-wire service entrance. It will be readily appreciated, however, that the construction of the fitting may readily be adapted to two-wire or four-wire service without departing beyond the scope of the invention.

We claim as our invention:

1. A service entrance fitting for use with overhead electric cables and comprising, in combination, an integral head of inverted box-like form, a clamping apron depending from said head and having a relatively shallow trough-like channel for receiving an entrance cable, a clamping plate having a gripping portion with a relatively shallow trough-like cable receiving channel, a first means for urging said clamping apron and said gripping portion together with the entrance cable clamped therebetween, detachable gripping blocks housed within said head and disposed for engaging therebetween individual ones of the service wires of the entrance cable, and a second means including an angular extension fixed to said clamping plate and disposed in underlying relation with said gripping blocks for retaining the same in engaged relation with the service wires, said second means being secured in operative position as an incident to actuation of said first means.

2. A service entrance fitting for electric cable and comprising, in combination, a head of inverted box-like form having integral depending front and rear walls, said depending front wall being slotted upwardly from its lower edge, said depending rear wall having a cable clamping channel therein, service wire gripping blocks detachably mounted in said slotted front wall and disposed to sandwich a pair of service wires therebetween, a closure member detachably mounted on the bottom of said head, said closure member having one portion disposable in underlying abutting relation with said gripping blocks to retain them in assembled position in said front wall, said closure member having another portion disposable in abutting relation with an entrance cable to clamp the same against the cable clamping channel of said depending rear wall.

3. In a service entrance fitting for electric power cable and having a head with an integral clamping apron and an open bottom, the combination comprising a bottom closure plate having a clamping portion disposed in cooperating relation with said apron to clamp an entrance cable thereagainst, said bottom closure plate also having an extension portion disposed in abutting relation against the bottom of said head, said extension portion having an exposed lower face, said clamping portion defining an angle greater than ninety degrees with said exposed lower face of said extension, and a pair of clamping screws mounted on said clamping apron for clamping the clamping portion of said bottom closure plate to said apron, said screws being disposed in substantially parallel relation with said extension but in skewed relation with said clamping portion.

4. In a service entrance fitting, the combination comprising a hollow inverted head, a depending clamping apron integral with said head, said apron having an entrance cable receiving channel therein, a pair of clamping screws threaded in said apron in straddling relation with said channel, a generally L-shaped clamping plate attachable to said head by means of said screws, said plate having a cable clamping portion and an extension portion angularly disposed thereto, said plate also having a pair of screw slots each extending into said clamping portion and into said angularly disposed extension portion, the slots in said extension portion terminating in lateral enlargements of appropriate size to pass over the heads of said screws upon assembly of said fitting, the slots in said extension portion also defining safety shoulders between said lateral enlargements and said clamping portion for precluding accidental disengagement of said L-shaped clamping plate from said screws.

References Cited in the file of this patent

UNITED STATES PATENTS

| Number | Name | Date |
|---|---|---|
| 1,484,001 | Ainsworth | Feb. 19, 1924 |
| 1,571,221 | Wilson | Feb. 2, 1926 |
| 1,847,689 | Gribbie | Mar. 1, 1932 |
| 1,888,645 | Vibber | Nov. 22, 1932 |
| 2,000,374 | Buchanan | May 7, 1935 |
| 2,065,297 | Wiechers | Dec. 22, 1936 |
| 2,148,059 | Dann | Feb. 21, 1939 |